US009122967B2

(12) United States Patent
King (10) Patent No.: US 9,122,967 B2
(45) Date of Patent: Sep. 1, 2015

(54) RADIO FREQUENCY IDENTIFICATION TAGS AND METHODS EMPLOYING CERAMIC COMPONENTS, WHICH MAY BE SUITABLE FOR USE IN EXTREME ENVIRONMENTAL CONDITIONS

(75) Inventor: Patrick F. King, Simpsonville, SC (US)

(73) Assignee: Technologies ROI, LLC, Simpsonville, SC (US)

( * ) Notice: Subject to any disclaimer, the term of this patent is extended or adjusted under 35 U.S.C. 154(b) by 77 days.

(21) Appl. No.: 13/082,631

(22) Filed: Apr. 8, 2011

(65) Prior Publication Data

US 2011/0253793 A1    Oct. 20, 2011

Related U.S. Application Data

(60) Provisional application No. 61/324,078, filed on Apr. 14, 2010, provisional application No. 61/368,485, filed on Jul. 28, 2010.

(51) Int. Cl.
| | |
|---|---|
| *G06K 19/06* | (2006.01) |
| *G06K 19/077* | (2006.01) |
| *H01Q 1/22* | (2006.01) |
| *H01Q 19/00* | (2006.01) |

(52) U.S. Cl.
CPC ...... *G06K 19/0773* (2013.01); *G06K 19/07728* (2013.01); *G06K 19/07756* (2013.01); *G06K 19/07758* (2013.01); *G06K 19/07771* (2013.01); *H01Q 1/2225* (2013.01); *H01Q 1/2233* (2013.01); *H01Q 19/00* (2013.01); *Y10T 29/49018* (2015.01)

(58) Field of Classification Search
USPC ............ 235/492, 451; 340/572.7, 572.1
See application file for complete search history.

(56) References Cited

U.S. PATENT DOCUMENTS

| | | | |
|---|---|---|---|
| 1,867,152 | A | 7/1932 | Higgins |
| 2,156,466 | A | 5/1939 | Vogt |
| 2,828,848 | A | 4/1958 | Symonds |
| 3,001,906 | A | 9/1961 | Capella et al. |
| 5,347,280 | A | 9/1994 | Schuermann |
| 5,922,550 | A | 7/1999 | Everhart et al. |
| 6,166,638 | A | 12/2000 | Brady et al. |
| 6,424,263 | B1 | 7/2002 | Lee et al. |
| 6,441,740 | B1 | 8/2002 | Brady et al. |
| 6,630,910 | B2 | 10/2003 | Forster et al. |
| 6,836,253 | B2 | 12/2004 | Strache et al. |
| 6,914,562 | B2 | 7/2005 | Forster |
| 6,978,668 | B2 | 12/2005 | Starinshak |
| 6,999,028 | B2 | 2/2006 | Egbert |
| 7,042,413 | B2 | 5/2006 | Mazoki et al. |
| 7,050,017 | B2 | 5/2006 | King et al. |
| 7,055,754 | B2 | 6/2006 | Forster |
| 7,064,668 | B2 | 6/2006 | Porad |
| 7,102,520 | B2 | 9/2006 | Liu et al. |

(Continued)

OTHER PUBLICATIONS

Non-final Office Action for U.S. Appl. No. 13/086,760 mailed Mar. 20, 2013, 7 pages.

(Continued)

*Primary Examiner* — Ahshik Kim
(74) *Attorney, Agent, or Firm* — Withrow & Terranova PLLC (57) ABSTRACT

RFID tags capable of operating in harsh environments include an RFID chip and antenna positioned on a ceramic substrate are disclosed. Alternatively, in other embodiments an RFID chip may be positioned inside a metal shell and then secured to a work piece in the hazardous environment.

19 Claims, 8 Drawing Sheets

(56) References Cited

U.S. PATENT DOCUMENTS

| | | | |
|---|---|---|---|
| 7,205,898 | B2 | 4/2007 | Dixon et al. |
| 7,221,277 | B2 | 5/2007 | Caron et al. |
| 7,615,856 | B2 | 11/2009 | Sakai et al. |
| 7,619,576 | B2 | 11/2009 | Beckley et al. |
| 7,659,857 | B2 | 2/2010 | King |
| 7,928,922 | B2 * | 4/2011 | King ............................ 343/795 |
| 2004/0099744 | A1 * | 5/2004 | Cuperus et al. ............... 235/491 |
| 2004/0159383 | A1 | 8/2004 | Adamson et al. |
| 2006/0109124 | A1 | 5/2006 | Dixon et al. |
| 2006/0212096 | A1 | 9/2006 | Stevenson |
| 2006/0220866 | A1 | 10/2006 | Dixon et al. |
| 2006/0220867 | A1 | 10/2006 | Dixon et al. |
| 2006/0232419 | A1 | 10/2006 | Tomioka et al. |
| 2007/0132593 | A1 | 6/2007 | Yamazaki |
| 2007/0173886 | A1 | 7/2007 | Rousso et al. |
| 2007/0182640 | A1 * | 8/2007 | Oohira .................. 343/700 MS |
| 2007/0200706 | A1 | 8/2007 | Lee |
| 2008/0061983 | A1 | 3/2008 | Dokai et al. |
| 2008/0106418 | A1 * | 5/2008 | Sloan et al. ................. 340/572.7 |
| 2008/0111760 | A1 * | 5/2008 | Sakama et al. ................. 343/860 |
| 2008/0122631 | A1 * | 5/2008 | Kodukula et al. ........... 340/572.8 |
| 2008/0258875 | A1 * | 10/2008 | Jesme et al. ................... 340/10.1 |
| 2009/0121942 | A1 | 5/2009 | Lee |
| 2009/0173007 | A1 * | 7/2009 | Fogg ................................ 49/70 |

OTHER PUBLICATIONS

Notice of Allowance for U.S. Appl. No. 13/086,760 mailed Jun. 11, 2013, 8 pages.

Non-final Office Action for U.S. Appl. No. 12/641,907 mailed Sep. 16, 2010, 6 pages.

Notice of Allowance for U.S. Appl. No. 12/641,907 mailed Dec. 23, 2010, 6 pages.

Notice of Allowance for U.S. Appl. No. 11/771,600 mailed Sep. 25, 2009, 6 pages.

www.jedec.org/standards-documents/results/small-outline package; JEDEC Solid State Technology Corporation, Arlington, VA, Apr. 2011.

* cited by examiner

RADIO FREQUENCY IDENTIFICATION TAGS AND METHODS EMPLOYING CERAMIC COMPONENTS, WHICH MAY BE SUITABLE FOR USE IN EXTREME ENVIRONMENTAL CONDITIONS

RELATED APPLICATIONS

The present application claims priority to U.S. Provisional Patent Application Ser. No. 61/324,078, filed Apr. 14, 2010 entitled "RFID TAG AND METHOD EMPLOYING CERAMIC COMPONENT, AND SUITABLE FOR USE IN EXTREME ENVIRONMENTAL CONDITIONS", which is incorporated herein by reference in its entirety.

The present application claims priority to U.S. Provisional Patent Application Ser. No. 61/368,485, filed Jul. 28, 2010, entitled "RFID TAG AND METHOD EMPLOYING CERAMIC COMPONENT AND SUITABLE FOR USE IN EXTREME ENVIRONMENTAL CONDITIONS" which is incorporated herein by reference in its entirety.

The present application is also related to U.S. patent application Ser. No. 11/771,600, filed Jun. 29, 2007, issued as U.S. Pat. No. 7,659,857, entitled "SYSTEM AND METHOD FOR PROVIDING A LOW AND NARROW-PROFILE RADIO FREQUENCY IDENTIFICATION (RFID) TAG" which is incorporated herein by reference in its entirety.

BACKGROUND

1. Field of the Disclosure

The present disclosure is directed to a radio frequency identification (RFID) tag adapted for use in extreme environmental conditions, the encasement of the tag within a metal shell for protection, and the use of the metal shell for radio frequency (RF) coupling.

2. Technical Background

Radio frequency identification (RFID) chips are attached to products for a variety of business reasons, including asset tracking, inventory, and other informational purposes. These uses are sometimes called "RFID tagging". RFID tagging has become increasingly common. Since the advent of second generation Ultra-High Frequency (UHF) standards (i.e. ISO-18000-6c), RFID tagging applications have grown at a rate greater than twenty percent (20%) per year according to some estimates. RFID tag volumes have increased to tens of millions per year and are trending upwards.

Many RFID applications entail specific performance requirements depending on environment and other specifications, one of which may be communication range. RFID communication range is often an important requirement that affects antenna design. Currently, many RFID applications use a standard dipole antenna. The dipole antenna RFID tag may use a metal foil antenna that is directly bonded or capacitively coupled to the RFID chip.

Standard RFID tags tend to be fragile and susceptible to cracking at the RFID chip to antenna interface, or within the antenna itself, and are unstable when exposed to elevated temperatures. This instability does not alleviate the need for RFID tags that operate in extreme environmental conditions.

SUMMARY OF THE DETAILED DESCRIPTION

Embodiments discussed herein include a radio frequency identification (RFID) chip may be attached to a ceramic film or substrate having an antenna printed thereon to form an RFID tag. The RFID tag may then be positioned in a metal recess and covered with a heat tolerant epoxy. The epoxy fixedly positions the RFID tag within the confines of the metal recess. Despite being within the metal recess, the RFID tag may still respond to interrogation.

In another embodiment, an RFID tag that may be positioned inside a metal shell is discussed. The metal shell may be affixed to an object in a hazardous environment. While it is generally understood that metal placed between an interrogator and an RFID tag typically blocks communications with the RFID, according to embodiments of the present disclosure, the shell helps act as an antenna for the RFID tag to allow the RFID tag to be interrogated despite being protected within the metal shell.

A radio frequency apparatus, comprising an RFID chip, an antenna coupled to the RFID chip, thereby forming an RFID tag and a metal shell coupled to the RFID tag wherein the shell provides a second antenna for the RFID tag.

A method comprising securing an RFID chip to a first antenna to form an RFID tag placing the RFID tag in a metal recess and filling the recess with a temperature resistant filler that insulates the RFID tag.

A structure comprising an RFID chip a ceramic substrate comprising a printed antenna, the RFID chip coupled to the ceramic substrate to form an RFID tag and a metal shell surrounding the RFID tag and coupled thereto such that when an RFID interrogation signal is directed at the metal shell, a return signal is generated.

DETAILED DESCRIPTION

The present disclosure allows placement of radio frequency identification (RFID) tags in environments which historically have been considered too extreme for sustained operability of the RFID tags. Embodiments discussed herein include a radio frequency identification (RFID) chip may be attached to a ceramic film or substrate having an antenna printed thereon to form an RFID tag. The RFID tag may then be positioned in a metal recess and covered with a heat tolerant epoxy. The epoxy fixedly positions the RFID tag within the confines of the metal recess. Despite being within the metal recess, the RFID tag may still respond to interrogation. In another embodiment, an RFID tag that may be positioned inside a metal shell is discussed. The metal shell may be affixed to an object in a hazardous environment. While it is generally understood that metal placed between an interrogator and an RFID tag typically blocks communications with the RFID, according to embodiments of the present disclosure, the shell helps act as an antenna for the RFID tag to allow the RFID tag to be interrogated despite being protected within the metal shell. A radio frequency apparatus, comprising an RFID chip, an antenna coupled to the RFID chip, thereby forming an RFID tag and a metal shell coupled to the RFID tag wherein the shell provides a second antenna for the RFID tag. A method comprising securing an RFID chip to a first antenna to form an RFID tag placing the RFID tag in a metal recess and filling the recess with a temperature resistant filler that insulates the RFID tag. A structure comprising an RFID chip a ceramic substrate comprising a printed antenna, the RFID chip coupled to the ceramic substrate to form an RFID tag and a metal shell surrounding the RFID tag and coupled thereto such that when an RFID interrogation signal is directed at the metal shell, a return signal is generated. In an exemplary and non-limiting example, such environments include high temperature and/or high pressure environments.

Figure 1:
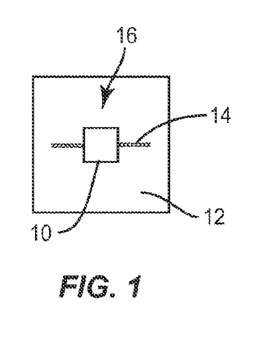
FIG. 1 illustrates a top plane view of a first embodiment of a radio frequency identification (RFID) tag.
Figure 2:
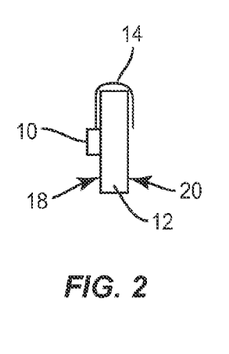
FIG. 2 illustrates an elevational side view of the embodiment of FIG. 1.

In a first embodiment, the present disclosure provides an RFID tag capable of use in such environments. Building on the disclosure of the previously incorporated U.S. Pat. No. 7,659,857, FIG. 1 illustrates an RFID chip 10 mounted on a ceramic substrate 12 and secured to a braided dipole antenna 14. Together the RFID chip 10 and the braided dipole antenna 14 form an RFID tag 16. As discussed in the '857 patent, the RFID chip 10 carrier package may conform to a small-outline package (SOP), the specifications of which are by the JEDEC Solid State Technology Corporation (hereafter "JEDEC"), of Arlington, Va. and which are available at www.jedec.org. In the exemplary illustrated embodiment of FIG. 1, the RFID chip 10 and the braided dipole antenna 14 are on the same side (e.g., front side 18) of the ceramic substrate 12. In another embodiment, the braided dipole antenna 14 may extend around the ceramic substrate 12 so that a part of the braided dipole antenna 14 is on the front side 18 of the ceramic substrate 12 and part of the braided dipole antenna 14 is on back side 20 of the ceramic substrate 12 (i.e., on the side opposite the side on which the RFID chip 10 is positioned, see FIG. 2). Read distances may be varied by changing the thickness, overall size and type of ceramic employed. Exemplary materials include the K65 ceramic with silver coating on both faces manufactured by Super Electronics Co LTD of Taipei Taiwan. The K65 ceramic is normally sold for use in GPS applications and may include a shorting pin in the center of the ceramic substrate 12. In the illustrated embodiments, this shorting pin has been removed. Other materials include 90M and 90Z ceramics. Exemplary sizes are 25 millimeters (mm)× 25 mm×4 mm; 18 mm×18 mm×4 mm; 15 mm×15 mm×4 mm; 10 mm×10 mm×4 mm; and 25 mm×10 mm×4 mm. In an exemplary embodiment, aluminum tape may be used to attach the wires to the faces of the ceramic substrate 12. Alternatively, solder may be used to create a more robust attachment.

While the illustrated examples of the ceramic substrate 12 are all rectangular, other shapes may be used including, but not limited to circular, trapezoidal, or other custom shapes as desired. The thickness of the ceramic component is particularly contemplated as being between approximately 2 mm and 5 mm, but other thicknesses are also possible depending on design constraints.

Figure 3A:
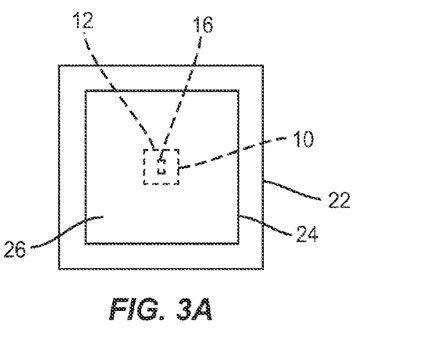
FIGS. 3A & 3B illustrates the RFID tag of FIG. 1 embedded in a recess.
Figure 3B:
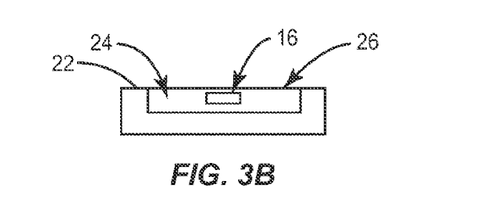

RFID tag 16 coupled to the ceramic substrate 12 may also be embedded into metal structures 22 that define or otherwise provide a recess 24 for RFID tagging as illustrated in FIGS. 3A & 3B. The recess 24 may be backfilled with epoxy 26, covering the RFID tag 16. Alternatively, the RFID tag 16 may be encapsulated in an appropriate plastic or other resin. An exemplary epoxy that can be used is the Cortronics Duralco 4525 epoxy. Tests using this structure have worked at temperatures of 200° C. and pressures of 15000 pounds per square inch (psi).

Figure 4:
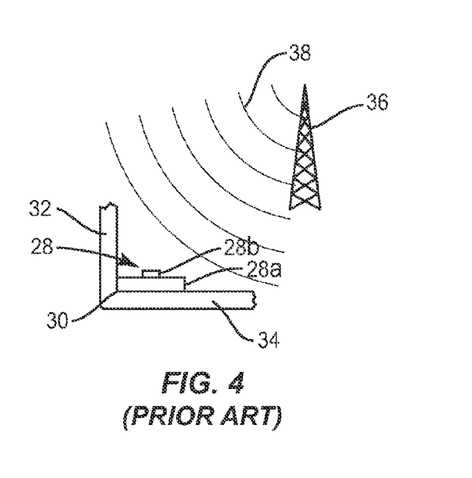
FIG. 4 illustrates a conventional RFID tag non-operationally positioned at a corner of two metal plates.

Alternate embodiments of the present disclosure allow the RFID tag 16 to be associated with other arrangements which heretofore were hostile to RFID tag placement. For example, in the past and as illustrated in FIG. 4, placing an RFID tag 28 having antenna 28a and chip 28b at corner 30 where two metal plates 32, 34 met caused the RFID tag 28 to be unreadable when an interrogator 36 sent out an interrogation signal 38. It is believed that the failure to read the RFID tag 28 is due to capacitive coupling of the RFID tag 28 with the virtual ground plane of the metal plates 32, 34. Even if not grounded out, the RFID tag 28 becomes inoperative at the desired operating frequency as the metal plates 32, 34 interact with the antenna 28a of the tag and change its resonant frequency (i.e., the RFID tag 28 becomes detuned).

Figure 5:
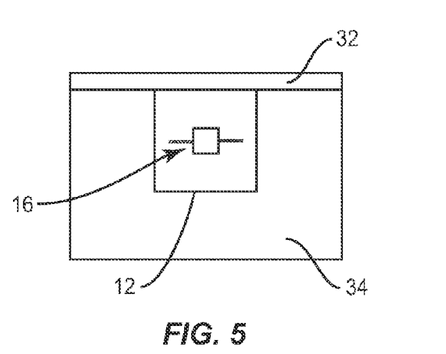
FIG. 5 illustrates an RFID tag of the present disclosure operationally positioned at a corner of two metal plates.

Despite this historical concern, the embodiment of FIG. 1 allows placement in such environments without detuning the RFID tag 16. For example, as illustrated in FIG. 5, RFID tag 16 on the ceramic substrate 12 placed in the corner 30 of the two metal plates 32, 34 still operates within expected performance metrics. During preliminary testing, a conventional tag had initial readings of one (1) meter using an Advanced ID 110 reader and no reading when placed in the corner 30 of the metal plates 32, 34. In contrast, the RFID tag 16 with the ceramic substrate 12 maintained its performance using an identical test procedure.

Figure 6:
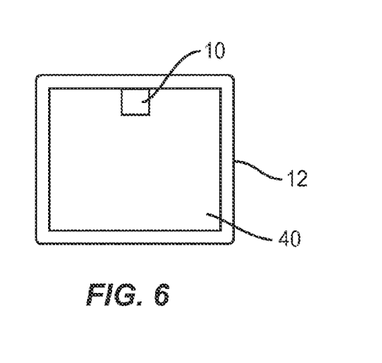
FIG. 6 illustrates an RFID tag with a patch antenna printed on a ceramic substrate.
Figure 7:
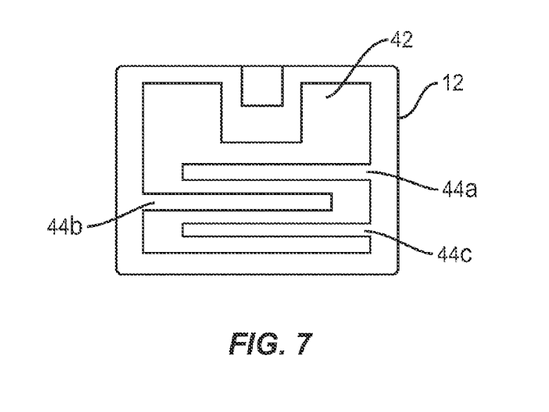
FIG. 7 illustrates an RFID tag with a tuned antenna printed on a ceramic substrate.

In an alternate embodiment, the ceramic substrate 12 may include the antenna printed thereon (i.e., the braided dipole antenna 14 is replaced with an antenna printed on the ceramic substrate 12). This embodiment is illustrated in FIG. 6, wherein the antenna 40 may be a metallic film printed on the ceramic substrate 12. In an exemplary embodiment, the metallic film is a silver film. In an alternate manufacturing embodiment, a large ceramic blank may be used and have a plurality of RFID chips 10 placed thereon. The large ceramic blank may then be cut or otherwise machined to produce a plurality of RFID tags. The large ceramic blank may have a metallic film preprinted on it as desired, or the film (or other antenna) may be applied after cutting.

Where the antenna is pre-printed on the ceramic substrate 12, various alternate designs may be used for the antenna. For example, as illustrated in FIG. 7, a patch antenna 42 with a plurality of branches 44a, 44b, and 44c (referred to collectively as branches 44) removed causes the patch antenna 42 to be tuned to a selected operating frequency. Branches 44 or other shapes may be created by etching or similar techniques. While the branches 44 create an inductive component for the antenna, other shapes may be used to add capacitive elements or to change the effective resistance of the patch antenna 42. It should be noted that the tuning of the patch antenna 42 may be done empirically or theoretically. In essence, changing the shape of the patch antenna 42 creates inductive paths and capacitive coupling between proximate elements to effectuate the desired tuning. These elements are readily modeled with appropriate software and well understood. In the embodiment of FIG. 7, the ceramic substrate 12 may be 18.8 mm×18.8 mm×4 mm with an Impinj Monza RFID chip in a Mini Small Outline Package (MSOP) directly attached to the ceramic component.

While the embodiments disclosed above are useful for various environments, in general, those embodiments presuppose that the item on which the RFID tag 16 is mounted has the recess 24 in which the RFID tag 16 may be positioned. There are many instances where such a recess is not available. The present disclosure extends the teachings of the earlier embodiments as explained below.

As noted above, normally direct attachment of an RFID tag to a metal surface effectively eliminates the ability of the RFID tag to function. Despite this historical observation, the present disclosure allows the RFID tag to be positioned within a metal shell. The shell may take a number of different shapes or sizes as further explained. In an exemplary embodiment illustrated in FIG. 8 the RFID tag 46 is placed inside a cavity or an aperture of metal shell 48. In a first embodiment, the RFID tag 46 may be identical to the RFID tag 16 described above. In a second embodiment, the RFID tag 46 may be a commercially available tag. The size of the metal shell 48 including the dimensions of aperture(s) 50 may be varied to determine empirically what dimensions provide a full read response from an interrogator. Note that it is also possible to determine the dimensions theoretically using a program such as MATLAB, MATHEMATICA, or the like.

Figure 8:
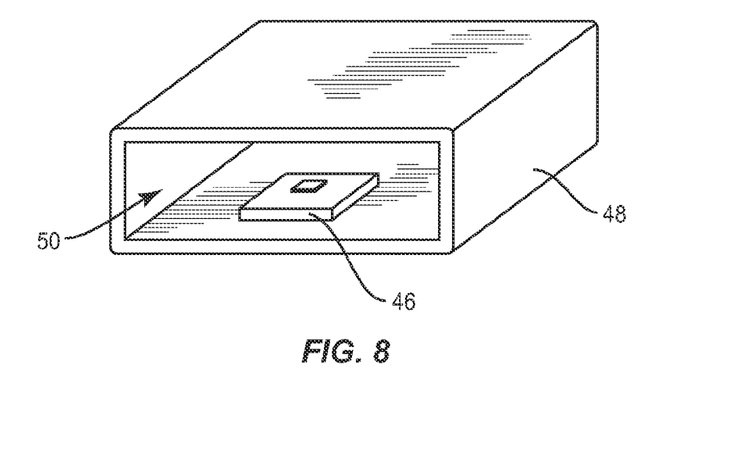
FIG. 8 illustrates an exemplary RFID tag positioned within a metal shell.

Normally, the further the RFID tag 46 is placed within the metal shell 48, the more likely it is that the RFID tag 46 will be completely shielded and have no response when interrogated. However, as noted above, the metal shell 48 may be sized in such a manner so that either the metal shell 48 or the aperture 50 resonates at a desired range of UHF frequencies.

Figure 9:
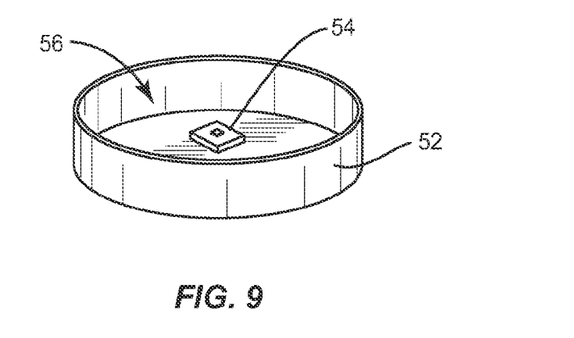
FIG. 9 illustrates an exemplary RFID tag positioned within a second type of metal shell.

Instead of the flattened cylinder illustrated in FIG. 8, the metal shell may be a more dome or open cylindrical shape such as metal shell 52 illustrated in FIG. 9. Empirical data suggests that if RFID tag 54 is pressed into a cavity or an aperture 56 of the metal shell 52, below the top plane and resting on the base of one wall, the read distances are very short or non-existent. However, suspending the RFID tag 54 within the metal shell 52, but above the floor of the metal shell 52, allows the RFID tag 54 to exhibit excellent read distances.

Figure 10:
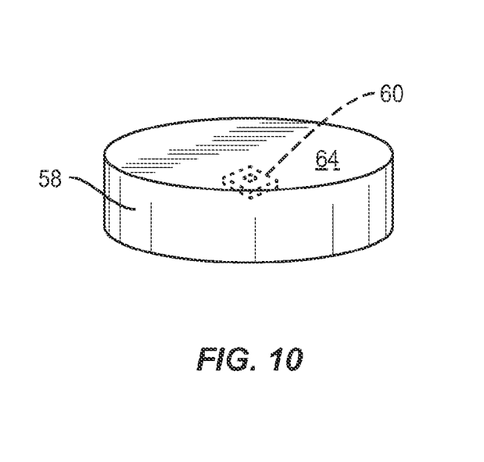
FIGS. 10 and 11 illustrate an exemplary RFID tag positioned within a metal shell and covered with epoxy.
Figure 11:
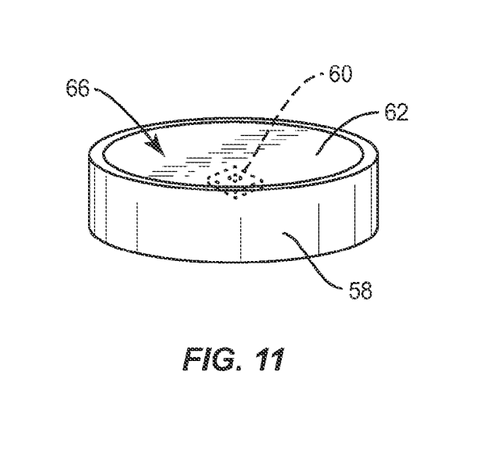
Figure 12:
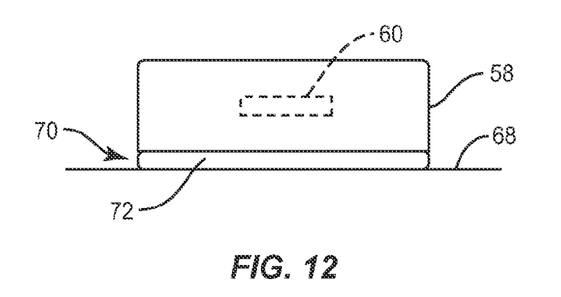
FIG. 12 illustrates a metal shell within an RFID tag positioned therein mounted on metal surface with a gap between the shell and the surface.

FIGS. 10 and 11 illustrate top and bottom views (respectively) of a metal shell 58 having a RFID tag 60 suspended therein and filled with a heat resistant epoxy 62. The heat resistant epoxy acts as a filler and helps the RFID tag 60 withstand high temperatures and otherwise insulates the RFID tag 60. As illustrated, looking at a top surface 64, the tag is completely occluded by the metal shell 58. Looking at a bottom surface 66, the metal shell 58 effectively cups the RFID tag 60 within the metal shell 58. Normally, interrogating the RFID tag 60 through the metal shell 58 results in no response as the metal shell 58 blocks the interrogation signal. However, when the metal shell 58 is mounted to a surface 68, a small gap 70 is provided as illustrated in FIG. 12. The gap 70 may be created by the space generated by an adhesive pad 72 that is used to secure the metal shell 58 to the surface 68. Gap 70 is believed to function as a slot antenna, thereby turning the entire metal shell 58 into either a second antenna for the RFID tag 60, or, alternatively, the metal shell 58 acts like part of the antenna for the RFID tag 60. While the adhesive pad 72 is particularly contemplated, other spacing elements that are relatively transparent to electromagnetic radiation at the desired UHF operating frequencies would also work. Other materials can be woven silica cloth, silicone pads provided by Emerson and Cuming, or acrylic adhesives provided by 3M. In an alternate embodiment, where the metal shell is attached by welding, the welding seam is planned so that an air gap is maintained across at least a portion of the periphery of the metal shell 58 to achieve the same function.

Figure 13:
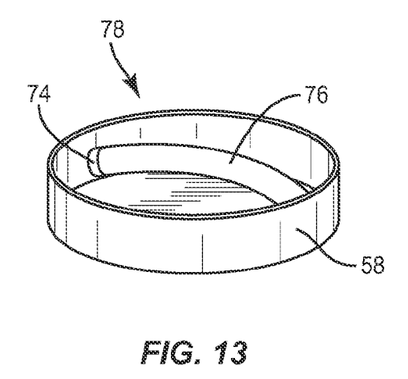
FIG. 13 illustrates an alternate embodiment of an RFID tag in a metal shell.

While it is particularly contemplated that the RFID tag 60 be a ceramic tag as described above, such is not required to achieve the tag to metal shell coupling that allows for a good read response. For example, as illustrated in FIG. 13, RFID chip 74 may be attached to a TTL-1 folded dipole antenna 76 to form an RFID tag 78 positioned in a metal shell 58. While the present disclosure has empirically determined that the TTL-1 folded dipole antenna 76 may be positioned slightly below the lip of the metal shell 58 and work correctly, it is possible that other positions also work. Such alternate locations may be determined empirically or theoretically, such as through a computer simulation.

The metal shell 58 may then be filled with a ceramic epoxy or other filler. The inverted tag can then be attached directly to a metal surface by cabling, drilling, banding, welding, or the like. The gap 70 formed by the adhesive pad 72, or a comparable gap formed through some other technique allows the interrogator to read the tag through the metal shell 58.

Figure 14:
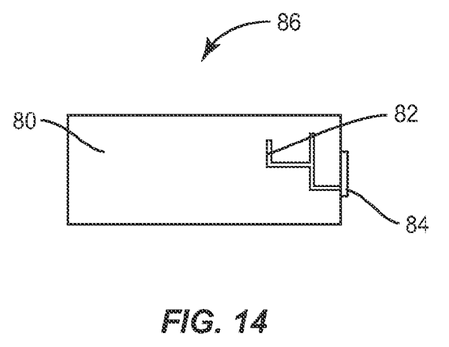
FIGS. 14 and 15 illustrate an alternate embodiment of an RFID tag suitable for insertion into a metal shell.
Figure 15:
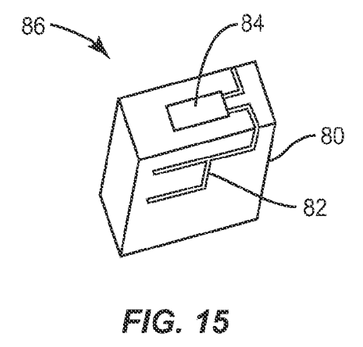

FIGS. 14 and 15 illustrate another alternate embodiment wherein a ceramic substrate 80 has an antenna 82 printed thereon. The antenna 82 has the appearance of an inverted F antenna, and may be such an antenna. The F shape (or other resulting shape) may be the result of cutting a commercial inlay such as those sold by Raflatec, Avery, Alien or the like, and which are cut to fit and folded around the ceramic substrate or attached directly to the metal shell 58. Please note that while an F is shown, other residual shapes are also within the scope of the present disclosure. An RFID chip 84 is attached by an adhesive and together forms an RFID tag 86. The chip is capacitively coupled to printed surfaces on the ceramic by short antenna leads retained from an original RFID inlay that was cut and wrapped around the ceramic substrate 80. The RFID tag 86 may then be positioned inside the metal shell 58.

Figure 16:
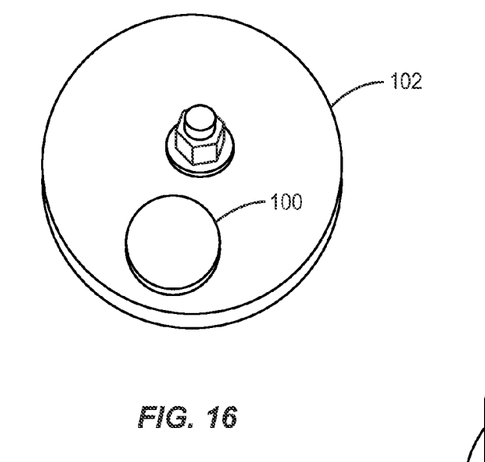
FIGS. 16-23 illustrate RFID tags according to the present disclosure in a variety of environments.

FIGS. 16-23 illustrate environments where embodiments of the present disclosure have successfully been tested. In particular, the metal shell 58 may be drilled, banded, etched, marked, welded, painted or have other industrial processes inflicted thereon without affecting the viability of the RFID tag 60 therein. Collectively such mechanisms are termed "a means for attachment." FIG. 16 illustrates an RFID tag within a metal shell (collectively referred as RFID tag 100) attached to a metal canister 102, which is a critical surface for an automated metal bending tool within a factory. Heat, motion and abrasion are all factors contributing to the environment which would quickly render a conventional tag inoperative. However the RFID tag 100 continues to operate in such environments. Likewise, the metal surface has heretofore caused RFID tags placed thereon to have very short or non-existent read distances. Embodiments of the present disclosure allow a desired read distance to be maintained.

Figure 17:
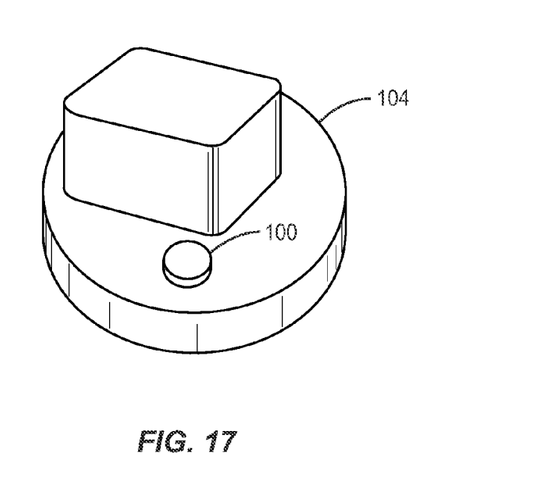

FIG. 17 illustrates the RFID tag 100 welded to an oil and gas industry pipe coupler 104. Petrochemicals traditionally accelerate the degradation of most tags. Likewise, the metal nature of the pipe contributes to short or non-existent read distances for conventional tags. In contrast, RFID tags 100 are protected from the degradation and exhibit acceptable read distances.

Figure 18:
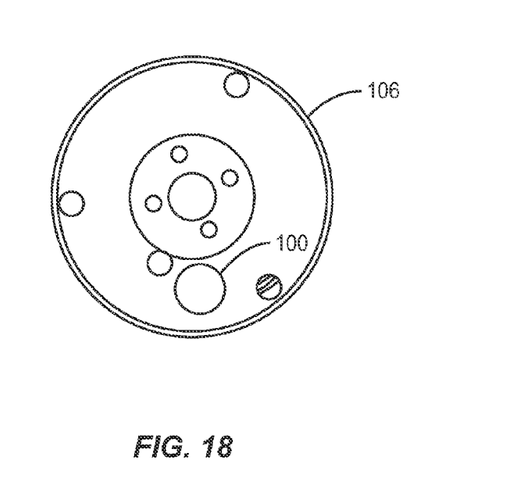

FIG. 18 illustrates the RFID tag 100 welded to a metal spool 106 having wire wound thereon for use in the telecommunications industry. The metal spool 106 normally shorts out RFID tags or otherwise inhibits read distances. However, embodiments of the present disclosure allow acceptable read distances to be maintained on such surfaces.

Figure 19:
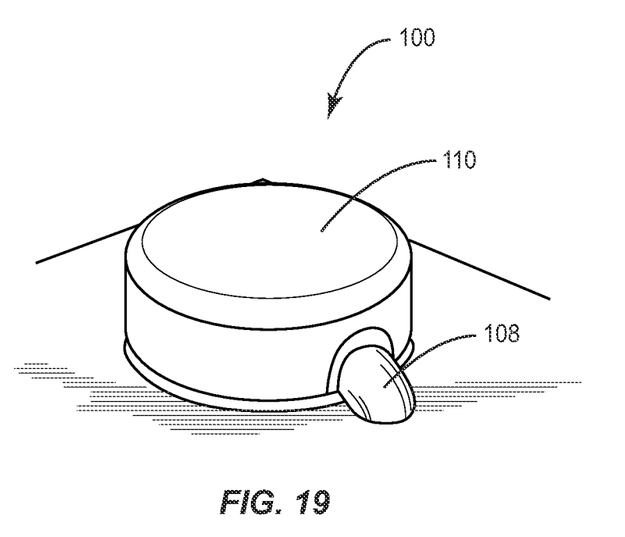

FIG. 19 illustrates the RFID tag 100 attached through a band 108 that extends through metal shell 110.

Figure 20:
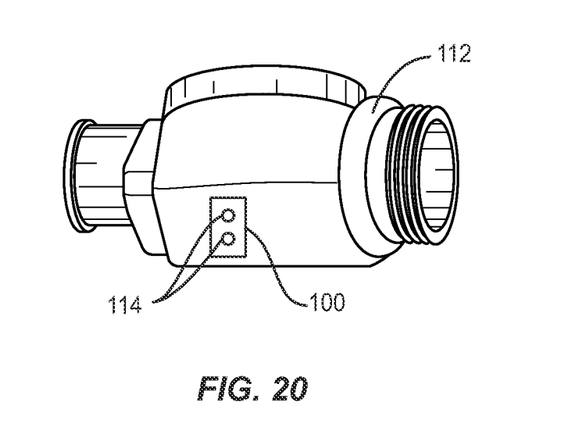

FIG. 20 illustrates the RFID tag 100 attached to a pipe fitting 112 through rivets 114.

Figure 21:
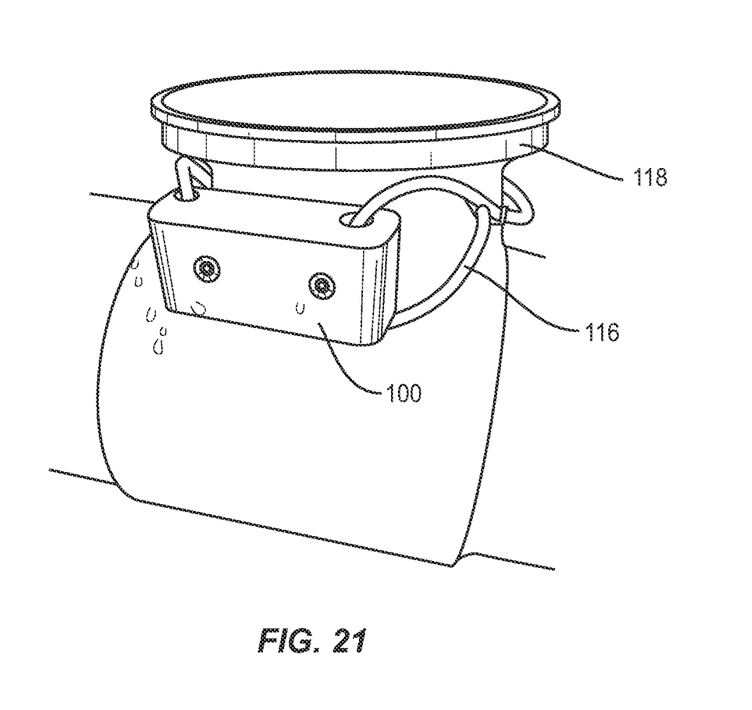

FIG. 21 illustrates the RFID tag 100 attached via a band 116 to an oil pipe 118.

Figure 22:
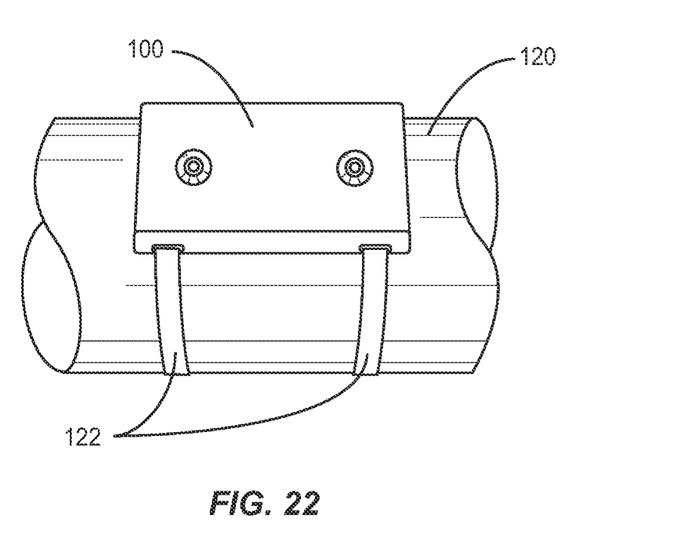

FIG. 22 illustrates the RFID tag 100 attached to a pipe 120 through metal bands 122.

Figure 23:
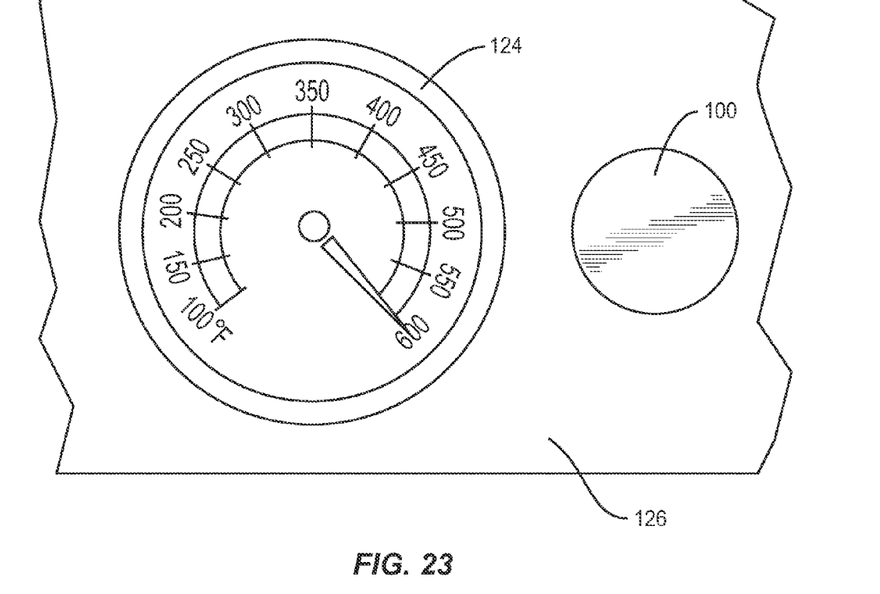

FIG. 23 illustrates the RFID tag 100 attached to a metal radiator 126. As evidenced by the pressure gauge, the temperature is approximately 600° F., but RFID tag 100 still functions within desired parameters.

In short, the embodiments of the present disclosure are well suited to be positioned within harsh environments or on surfaces that heretofore would have shortened read distances to an unacceptable level. Embodiments of the present disclosure preserve acceptable read distances and protect the RFID tag from the environmental conditions which otherwise would degrade performance of the RFID tag. The methods through which the RFID tag 100 is secured to a fixed position may be varied according to the needs of the environment, but permanent attachment methods such as welding and drilling and such do not compromise the functionality of the RFID tag 100.

While not illustrated, empirical tests have shown that embodiments according to the present disclosure allow the metal shell to be heated by direct application of a flame until the metal shell was red and glowing. An interrogator was still able to read the tag. Likewise, successful installations through direct welding where the welding torch heats the metal shell do not compromise the functionality of the tag. Still other experiments show that the metal shells may withstand hammer blows or other concussive impacts which would break or destroy a conventional tag.

Figure 24A:
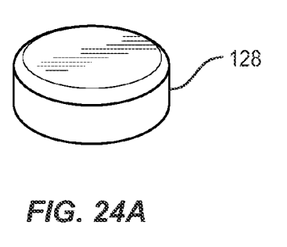
FIGS. 24A-24C illustrate another alternate embodiment of an RFID tag in a metal shell according to the present disclosure.
Figure 24B:
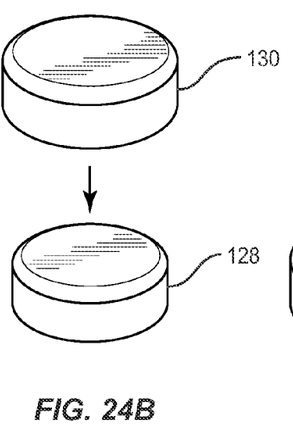
Figure 24C:
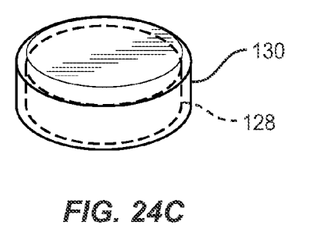

In still another embodiment illustrated in FIGS. 24A-24C, an RFID tag within a metal shell 128 may be positioned within a second metal shell 130. This double shroud may be empirically tested to verify that the tag is still readable by an interrogator.

Figure 25:
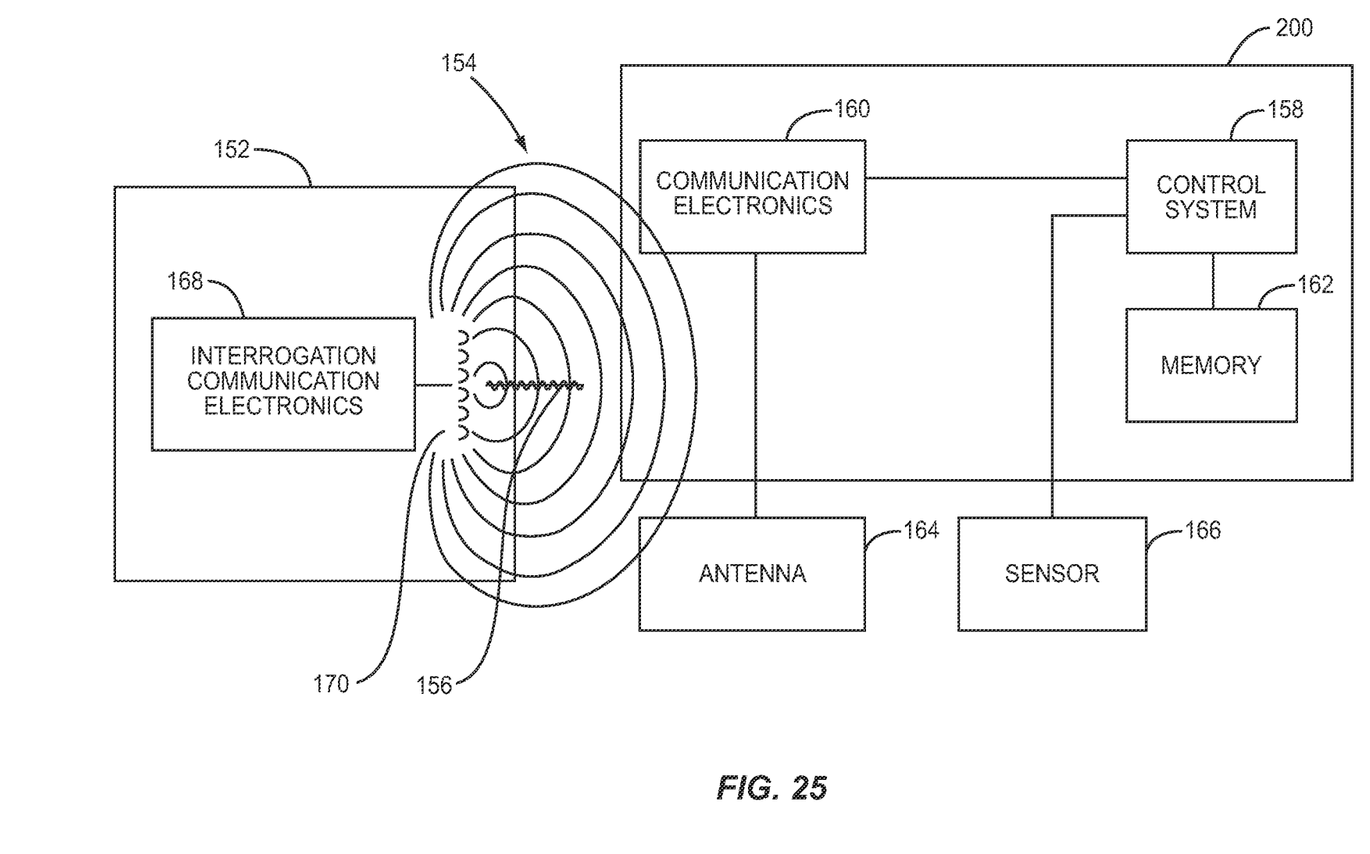
FIG. 25 illustrates an exemplary interrogator interoperating with an RFID tag.

In the interests of a full explanation, FIG. 25 is provided to explain the general operation of an interrogator and the RFID tags of the present disclosure. Thus, FIG. 25 illustrates a block diagram of an exemplary communication system 150 for communication between a wireless device, such as the low and narrow-profile RFID tag 200, and an interrogator 152. The present disclosure includes the RFID tag 200 for electronic communication. The RFID tag 200 is interrogated by the interrogator 152, whereby the transponder communicates back by altering field 154 containing an interrogation signal 156. This description refers to the terms "transponder," wireless communication device, and the RFID tag 100 interchangeably, and the use of the term transponder is not intended to limit the type of wireless communication device applicable to the present disclosure. Wireless communication devices are available that communicate at various frequencies, including ultra-high frequency (UHF) and very high frequency (VHF). One embodiment of the present disclosure uses the RFID tag 200 that is a passive radio-frequency device with the ability to rectify incoming radio energy and provide power to power the device for communication and operation. The present disclosure is also applicable to active devices that have their own power source for communications. It should be readily understood to one of ordinary skill in the art that there are many different types of wireless communication devices that allow electronic communication and thus the present disclosure is not limited to any one particular type.

The RFID tag 200 includes a control system 158 and communication electronics 160. The RFID tag 200 may also include a memory 162 for storage of information to be communicated to the interrogator 152. Alternatively, the RFID tag 200 may store information such as an identification number or other information by using diodes, dip switches, or some other like circuitry in lieu of the memory 162. An antenna 164 is provided to receive the interrogation signal 156 from the interrogator 152. The RFID tag 200 may also be connected to a sensor 166 for sensing ambient or environmental information surrounding the RFID tag 200. One example of the sensor 166 may be a quartz crystal resonator like that described in U.S. Pat. No. 5,922,550, entitled "BIOSENSING DEVICES WHICH PRODUCE DIFFRACTION IMAGES" to Everhart et al., which is incorporated herein by reference in its entirety. A quartz crystal resonator detects analytes that may be present in food. Analytes include, but are not limited to, microorganisms such as bacteria, yeasts, fungi, and viruses.

The antenna 164 receives the interrogation signal 156 through the radiated interrogation field 154. The antenna 164 passes information received by the interrogation signal 156 to the communication electronics 160. The communication electronics 160 includes circuitry necessary to interpret the interrogation signal 156 from the field 154 and to further communicate the interpreted interrogation signal 156 to the control system 158. The control system 158 may include an integrated circuit, printed circuit board, or other type of microprocessor or micro-controller electronics that controls the operations of the RFID tag 200. The control system 158 is connected to the communication electronics 160 to communicate and receive transmissions. The control system 158 is also connected to the memory 162 for storing and retrieving information. The control system 158 may further include a clock (not shown). The control system 158 determines if any action is needed in response to the communications received from the communication electronics 160.

FIG. 25 also illustrates how communication is achieved with the RFID tag 200 using the interrogator 152. The interrogator 152 includes interrogation communication electronics 168 and an interrogation antenna 170. The interrogation reader 152 communicates with the RFID tag 200 by emitting the interrogation signal 156 modulated in a frequency by the interrogation communication electronics 168 through the interrogation antenna 170. The interrogation antenna 170 may be any type of antenna that can radiate the interrogation signal 156 through the field 154 so that a compatible device, such as the low and narrow-profile RFID tag 200, can receive the interrogation signal 156 through its own antenna 164. The field 154 could be electro-magnetic, magnetic, or electric. The interrogation signal 156 includes a message containing information or a specific request for the RFID tag 200.

When the antenna 164 is in the presence of the field 154 emitted by the interrogator 152, the communication electronics 160 are energized by the signal 156, thereby energizing the RFID tag 200. The RFID tag 200 remains energized so long as the antenna 164 is in the field 154 of the interrogator 152. The communication electronics 160 demodulates the interrogation signal 156 and sends the message containing the information or the specific request to the control system 158 for appropriate actions. For example, the request may be for the RFID tag 200 to communicate its identification, or information about a material or package associated with the RFID tag 200, such as date of manufacture, place of manufacture, and/ or lot number. The message may also be a request for information regarding ambient or environmental measurements sensed by the sensor 166.

Those skilled in the art will recognize improvements and modifications to the embodiments set forth herein. All such improvements and modifications are considered within the scope of the concepts disclosed herein and the claims that follow.

What is claimed is:

1. A radio frequency apparatus, comprising:
an RFID chip;
a primary antenna coupled to the RFID chip, thereby forming a functional RFID tag; and
a metal shell encasing the functional RFID tag and coupled to the RFID tag wherein the shell provides a second antenna for the functional RFID tag such that the RFID tag communicates in an ultra high frequency band (UHF).

2. The radio frequency apparatus of claim 1, wherein the primary antenna comprises a printed antenna printed on a ceramic substrate.

3. The radio frequency apparatus of claim 1, wherein the shell defines a cavity and the functional RFID tag is positioned within the cavity.

4. The radio frequency apparatus of claim 3, further comprising a filler positioned within the cavity and holding the functional RFID tag in a desired position relative to the shell.

5. The radio frequency apparatus of claim 4, wherein the filler comprises a material adapted to withstand high temperatures and insulate the RFID chip.

6. The radio frequency apparatus of claim 1, wherein the metal shell comprises a dome shape.

7. The radio frequency apparatus of claim 1, wherein the metal shell comprises a flattened cylinder shape.

8. The radio frequency apparatus of claim 1, further comprising a means for attachment to secure the metal shell to a work piece.

9. The radio frequency apparatus of claim 1, wherein the primary antenna comprises a patch antenna.

10. The radio frequency apparatus of claim 1, wherein the primary antenna comprises a cut inlay antenna.

11. The radio frequency apparatus of claim 1, wherein the primary antenna comprises a braided dipole antenna.

12. The radio frequency apparatus of claim 1, wherein the primary antenna comprises a dipole antenna.

13. A radio frequency apparatus structure comprising:
an RFID chip;
a ceramic substrate comprising a printed antenna, the RFID chip coupled to the ceramic substrate to form an RFID tag; and
a metal shell surrounding the RFID tag and coupled thereto such that when an ultra high frequency (UHF) RFID interrogation signal is directed at the metal shell, a return signal is generated.

14. The structure of claim 13, wherein the metal shell comprises an open cylinder shape.

15. The structure of claim 13, further comprising an epoxy filler suspending the RFID chip within the metal shell such that the RFID chip does not touch a side or bottom of the metal shell.

16. A radio frequency apparatus, comprising:
an RFID chip;
an antenna coupled to the RFID chip, thereby forming an RFID tag operative in an ultra high frequency (UHF) band; and
a metal shell coupled to the RFID tag wherein the metal shell provides a second antenna for the RFID tag, wherein the metal shell comprises a dome shape.

17. A radio frequency apparatus, comprising:
an RFID chip;
an antenna coupled to the RFID chip, thereby forming an RFID tag operative in an ultra high frequency (UHF) band; and
a metal shell coupled to the RFID tag wherein the metal shell provides a second antenna for the RFID tag, wherein the metal shell comprises a flattened cylinder shape.

18. A radio frequency apparatus structure comprising:
an RFID chip;
a ceramic substrate comprising a printed antenna, the RFID chip coupled to the ceramic substrate to form an RFID tag operative in an ultra high frequency (UHF) band; and
a metal shell surrounding the RFID tag and coupled thereto such that when an RFID interrogation signal is directed at the metal shell, a return signal is generated, wherein the metal shell comprises an open cylinder shape.

19. A radio frequency apparatus structure comprising:
an RFID chip;
a ceramic substrate comprising a printed antenna, the RFID chip coupled to the ceramic substrate to form an RFID tag operative in an ultra high frequency (UHF) band;
a metal shell surrounding the RFID tag and coupled thereto such that when an RFID interrogation signal is directed at the metal shell, a return signal is generated; and
an epoxy filler suspending the RFID chip within the metal shell such that the RFID chip does not touch a side or bottom of the metal shell.

* * * * *